United States Patent Office 3,636,036
Patented Jan. 18, 1972

3,636,036
ALKYL SUBSTITUTED PHENYLENE DIISONITRILES
Ivar Ugi, 3611 McLaughlin Ave., Los Angeles, Calif. 90066
No Drawing. Application Sept. 26, 1966, Ser. No. 588,656, which is a continuation of application Ser. No. 264,707, Mar. 12, 1963. Divided and this application Feb. 11, 1970, Ser. No. 10,603
Int. Cl. C07c *119/02*
U.S. Cl. 260—465 H     2 Claims

ABSTRACT OF THE DISCLOSURE 1-methyl-3,5-diethyl-2,4-phenylene-diisonitrile, and 2,4,6-triisopropyl-1,3-phenylene-diisonitrile. The compounds are useful as cross-linking and hardening agents for plastics which contain carboxyl groups.

---

This application is a division of Ser. No. 588,656, filed Sept. 26, 1966, which in turn is a continuation of Ser. No. 264,707, filed Mar. 12, 1963, both now abandoned.

This invention relates to new polyisonitriles having at least two isonitrile groups and to a new process for their production. The new polyisonitriles may be represented by the general formula $C\leq N-R-N\geq C$, wherein R is selected from the group consisting of an alkylidene, having 4 to 12 carbon atoms, an arylidene, an alkylarylidene, an alkylidene carbonate, a monoisocyano arylidene, a mono-isocyano alkylarylidene, a diisocyano arylidene, a diisocyano alkylarylidene and a heterocyclic group.

It is already known to produce monoisonitriles by splitting off water from monoformylamines. This water is split off with agents known for this purpose in the homogeneous phase and in this way sometimes quite good yields of monoisonitriles are obtained.

It is difficult to apply this reaction to polyformylamines, because these compounds are only very slightly soluble in the solvents to be considered for the reaction.

However, it is known that the diisonitrile can be obtained from one special diformylamine by working in a large quantity of solvent, such as pyridine in order to manitain a homogeneous phase (see in this respect "Pharmazie" 1957, 12, 567–571).

This process is however not applicable on the large industrial scale for various reasons. On account of the poor solubility of the starting product, it is necessary to use a very large quantity of solvent. Despite the fact that the reaction is in homogeneous phase, only a very poor yield of diisonitrile is obtained. This is to be attributed to the fact that splitting of water from the formylamino group only takes place slowly on account of the high dilution, while the resinification reaction, which is produced by the agents splitting off water, proceeds quickly, even in dilute solution.

The new polyisonitriles can be prepared in a simple manner by splitting off water from polyformylamines with the aid of agents splitting off water and in the presence of bases and solvents if the suspension of the finely divided polyformylamine is reacted while stirring strongly with the agents splitting off water. In this case, therefore, the operation takes place in heterogeneous phase.

The course of the reaction according to the invention can in principle be reproduced by the following reaction scheme:

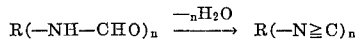

In this formula, R represents an alkyl, aryl, aralkyl or heterocyclic group, *n* is an integer of at least 2, indicating how many formylamino groups are contained in the molecule.

It is to be considered as extremely surprising that it is possible by the process according to the invention to produce polyisonitriles with good yields, although the reaction is conducted in heterogeneous phase. In view of the state of the art, it was to be assumed that the reaction would only proceed extremely slowly and as a result considerable resinification of the forming isonitriles would occur. Furthermore, when carrying out the reaction in heterogeneous phase, an excess of agents splitting off water in the liquid phase is unavoidable. However, this excess should cause considerable resinification of the isonitriles which are formed. It is a surprising fact that when carrying out the reaction in the heterogeneous phase resinification is completely checked in relation to the splitting off of water and undoubted formation of the isonitrile group.

As starting materials for the process of the invention there are to be considered all compounds which contain the formylamino grouping at least twice in the molecule. The formation of the molecule itself is of no importance for the progress of the reaction, as long as it involves hydrocarbon. These polyvalent hydrocarbon radicals can however also be further substituted by substituents which do not react under the reaction conditions. Such substituents include essentially halogens, such as fluorine, chlorine, bromine and iodine, cyanogen, sulphone, ether and disubstituted amino groups. The basic structure of the polyformylamines can however also contain heterocyclic compounds or consist of the latter.

The starting materials according to the invention are for the most part unknown. However, they can be produced in simple manner by heating the corresponding amines with formic acid, if desired in the presence of a solvent, such as dimethyl formamide, to temperatures between 80 and 150°. Solutions of highest possible concentration are preferably used for this purpose. On cooling, the required formylamino compounds crystallise out. In particular cases, this does not occur and then the excess solvent is distilled off in vacuo and the required formyl-amine is obtained as residue. Examples relating to the production of these starting materials are given in the examples of the reaction according to the invention.

Sterically hindered formylamines are particularly suitable for the reaction according to the invention. By "sterically hindered" formylamines, there are understood for example those aromatic formylamines which comprise substituents in one end advantageously in both o-positions. The bulk of the substituents is generally of no significance. The following are to be mentioned as examples of effective substituents: halogens, alkyl, aryl, alkoxy, aroxy and cycloalkyl groups as well as cyanogen and ester radicals. Steric hindrance of aromatic formylamines also occurs when they are disposed in juxtaposition to the orthofusion position in a polynuclear, aromatic system and possibly also contain another radical in the other o-position. Particularly valuable starting materials are represented by the sterically hindered amino derivatives of diphenyl and triphenyl alkanes.

The following compounds are to be specifically mentioned as polyformylamino compounds:
hexamethylene diformamide,
2-methyl-2,4-diformylamino pentane,
di-(2-methyl-2-formylamino-1-propyl) carbonate,
p-di-(2-formylamino-2-propyl) benzene,
1-methyl-3,5-diethyl-2,4-phenylene diformamide,
1,3,5-triisopropyl-2,4-phenylene diformamide,
4α-diformylethylbenzene,
1,5- and 2,7-naphthylene diformamides,
N,N'-diformyl benzidine and tolidine,
4,4'-diformylamino diphenyl methane,
3,3'-dimethyl-5,5'-dichloro-4,4'-diformylamino-diphenyl-methane, 3,3'-dimethyl-5,5'-diethyl-4,4'-diformylamino diphenylmethane,
3,3',5,5'-tetraethyl- and 3,3',5,5'-tetraisopropyl-4,4'-diformylamino diphenyl methane,
3,3'-dimethyl-4,4',4''-triformylamino triphenyl methane,
4,4',4''-triformylamino triphenyl phosphate and thiophosphate.

Acyl halides in the presence of bases may be used as agents splitting off water. The following halides may be mentioned: phosgene, cyanogen chloride, cyanuric chloride, cyanogen bromide, phosphorus trichloride, phosphorus bromide, phosphorus oxychloride, thionyl chloride, benzene sulphochloride, and toluene sulphochloride. The following compounds have proved especially suitable as bases: sodium tert.-butylate and potassium tert.-butylate, as well as trialkylamines, such as trimethylamine and triethylamine, but also diazabicyclooctane and heterocyclic tertiary bases, such as pyridine, and also potassium carbonate.

Combinations of phosgene with trimethylamine or triethylamine and also the combination of phosphorus oxychloride with pyridine are particularly suitable agents for splitting off water.

The temperature at which the reaction is carried out may be in the range of −40 to +120° C. It is advisable not to use temperatures of higher than 60° C. The preferred temperature range runs from about −20 to +50° C.

Preferably 0.5 to 2 mols and advantageously 0.9 to 1.3 mols of the acyl halide and 1.0 to 20 mols, preferably 1.8 to 4 mols, of the base are used for each mol of formylamino group in carrying out the reaction. About 0.3 to 5 litres and advantageously 0.4 to 2 litres of the solvent are used per mol of formylamino group for the production of the suspension. These quantities of solvent are by far below that necessary to dissolve the formylamino compounds. Generally, a solution is only formed with quantities of more than 20 litres of solvent per mol of formylamino compound.

Suitable as solvents are inert organic solvents, such as hydrocarbons, halogenated hydrocarbons, ethers, esters and tertiary amines. The following solvents are to be specifically mentioned: light petroleum fractions, benzene, methylene chloride, chloroform, diethyl ether, tetrahydrofuran, ethyl acetate, triethylamine and pyridine.

It is advisable to add the acyl halide to the thoroughly stirred suspension of the formylamine and the base with the solvent or to intoduce it in gaseous form. In principle, it is however possible for the reactants to be combined in any desired sequence; it is merely necessary to avoid the isonitrile which forms from coming into contact with strong acid.

In the reaction, it is very important for the solid phase to be thoroughly mixed in finest possible divided form with the liquid phase. High-power stirrer devices are especially suitable for this purpose, but also shaker-type vessels and vibromixers. The so-called liquid mills are particularly advantageous in that a number of relatively large solid particles are simultaneously broken down with thorough stirring.

The working up is generally effected by adding water, separating the organic phase, distilling off the solvent and purifying the isonitrile which is left by distillaton or recrystallisation. However, purification is frequently unnecessary, because the product is obtained with a sufficiently high degree of purity.

The process can also be carried out continuously, in which case trimethylamine is preferred as base, on account of its easy recoverability.

The products obtainable according to the invention are new and can serve as intermediate products for the manufacture of plant-protection agents and age resisters and against intestinal parasites of animals. They can in addition also be used directly for cross-linking or hardening synthetic plastics which contain carboxyl groups. For this purpose, the polyisonitriles are admixed with the synthetic plastics, such as acrylic acid polymers, maleic acid semi-ester and semi-amide polymers and itaconic acid semi-ester and semi-amide polymers, in quantities between about 0.2 and 10% and the mixture is heated to temperatures between 30 and 100°. The quantity of the polyisonitriles to be added depends firstly on the carboxyl number of the plastics and secondly on the required degree of cross-linking. The polyisonitriles react with the carboxyl groups with formation of carboxylic acid amide derivatives.

Particularly valuable properties for the use in synthesis reactions are provided by aromatic polyisonitriles in which the o-positions of the isonitrile groups are occupied by halogen, alkyl, cyanogen or ester groups or in which an isonitrile group is disposed in juxtaposition to an orthofusion position of a polycyclic aromatic system. These polyisonitriles have a somewhat hindered reactivity, which can be changed by the choice of o-substituents.

EXAMPLE 1

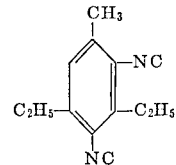

230 parts by weight of finely ground 1-methyl-3,5-diethyl-2,4-phenylene diformamide are suspended in 1.5 litres of dry pyridine and 200 g. of phosphorus oxychloride are so quickly added with stirring and cooling that the temperature of the reaction mixture does not exceed 60° C. The mixture is then poured into 5000 parts by volume of iced water and 1000 parts by volume of petroleum ether (B.P. 60–80°). The organic phase is separated, dried with solid potassium hydroxide and concentrated in vacuo. 188 parts by weight of a residue melting at 22–28° C. are obtained, and this residue can be purified by distillation (B.P. 108–110°/0.6 mm. Hg; M.P. 38–40°). The 1-methyl-3,5-diethyl-2,4-phenylene diisonitrile is obtained in a yield of 98 parts by weight. In the distillation, there is already considerable decomposition at bath temperatures above 120° C.

The starting material used for the reaction can be produced by dissolving 1-methyl-3,5-diethyl-2,4-phenylene diamine in an excess of formic acid to a concentrated solution at temperatures between 100 and 120° and by allowing the solution to cool after 1–5 hours. On cooling, the 1-methyl-3,5-diethyl-2,4-phenyl diformamide crystallises out and it has a melting point of 244 to 246°.

EXAMPLE 2

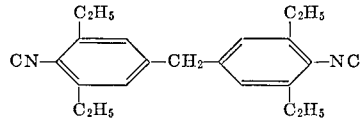

1058 parts by weight of finely ground 3,3',5,5'-tetraethyl-4,4'-diformylamino diphenyl methane are suspended in 2.0 litres of triethylamine and 4.0 litres of triethylamine and 4.0 litres of methylene chloride. With stirring and cooling with ice, 600 g. of phosgene are introduced so quickly that the internal temperature is 10–15° C. The mixture is then poured into iced water, the organic phase is separated, dried with anhydrous potassium carbonate and concentrated. Yield: 870 parts by weight of crude product with the melting point 87–95° C. After dissolving in and allowing to crystallise from ethanol, the melting point of the 3,3',5,5'-tetraethyl-4,4'-diisocyano diphenyl methane is 97–98°.

The starting material employed can be produced by dissolving 3,3',5,5'-tetraethyl - 4,4' - diaminodiphenyl methane in a molar excess of formic acid at temperatures from 100–110° to a concentrated solution and by allowing the solution to cool after 3-8 hours. The 3,3', 5,5'-tetraethyl-4,4'-diformyl amino diphenyl methane then crystallises out (M.P. 299-301° C.).

EXAMPLE 3

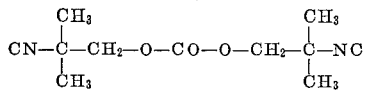

With stirring and cooling with ice, 100 parts by weight of phosgene are introduced into a suspension of 254 parts by weight of 2-methyl-2-N-formylamino-1-propanol (obtainable from the respective amino alcohol and a stoichiometric amount of formic acid by azeotropic distillation of the water formed during the reaction with toluene; melting point 67-70° C.), 800 parts by weight of triethylamine and 1500 parts by weight of methylene chloride, and the mixture is then heated under reflux for one hour. Another 200 parts by weight of phosgene are introduced at 0-15° C., the reaction is completed by heating to 30-40° C. for 10 minutes. Dry air is passed in for 10 minutes, 200 parts of water are added, the organic phase is separated, dried over anhydrous potassium carbonate, concentrated in vacuo and the residue is distilled in vacuo. Boiling point: 120-125° C./0.04 mm. Hg; M.P. 114-115° C.; yield 37 parts by weight of di(2-isocyano-2-methyl-1-propylene)-carbonate.

EXAMPLE 4

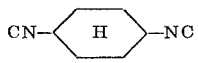

With stirring and cooling with ice, 100 parts by weight of phosgene are introduced into a suspension of 850 parts by weight of 1,4-diformylaminocyclohexane (obtainable by reacting hexahydro-1,4-phenylene diamine and formic acid in chlorobenzene and distilling off the reaction water; B.P. 200-202° C.), 2500 parts by weight of triethylamine and 5000 parts by weight of methylene chloride, 3000 parts by weight of water are added, the organic phase is separated off, dried over anhydrous potassium carbonate and concentrated in vacuo. Yield: 540 parts by weight of crude cyclohexane-1,4-diisocyanide of melting point 78-85° C. The residue is purified by recrystallization from methanol or ligroin or by distillation in vacuo (B.P. 115-120° C./0.1 mm. Hg; M.P. 92-94° C.).

EXAMPLE 5

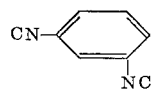

320 parts by weight of phosgene are reacted with a suspension of 260 parts by weight of diformyl-n-phenylene diamine, 750 parts by weight of triethyl amine and 1500 parts by weight of methylene chloride. After adding 1500 parts by weight of water, the organic phase is separated off, concentrated in vacuo at 20-30° C. and recrystallized from a mixture of benzene/ethyl acetate. Yield: 110 parts by weight of m-phenylene-diisocyanide; M.P. 75-78° C.

EXAMPLE 6

200 parts by weight of phosgene are introduced with stirring at 0-15° C. into a suspension of 164 parts by weight of diformyl-p-phenylene-diamine, 500 parts by weight of triethylamine and 1000 parts by weight of methylene chloride. After adding 1000 parts by weight of water, the organic phase is separated off, dried over potassium carbonate and concentrated in vacuo at 20-30° C. Yield: 98 parts by weight of crude p-phenylene-diisocyanide; decomposition from 100° C.

EXAMPLE 7

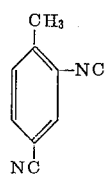

800 parts by weight of phosgene are introduced with stirring and by using a reflux condenser charged with a cooling liquid of -25° C. into a suspension of 710 parts by weight of 2,4-toluylene-di-formamide (obtainable from 2,4-toluylene amine and formic acid) in 1100 parts by weight of unhydrous trimethylamine and 4000 parts by weight of chloroform. After 3 hours 3000 parts by weight of water are added, the organic phase is separated, dried over unhydrous potassium carbonate, filtered and concentrated in vacuo at 20-30° C. The residue is purified by recrystallizing from methanol or ligroin or ethyl acetate. Yield: 191 parts by weight of 2,4-toluylene-diisocyanide; M.P. 87.5-88.5° C.

EXAMPLE 8

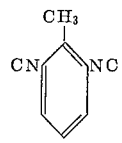

With stirring and cooling with ice, 760 parts by weight of phosgene are introduced into a suspension of 675 parts by weight of 2,6-toluylene-diformamide (obtainable from 2,6-toluylene-diamine by heating 90 percent formic acid), 1800 parts by weight of triethylamine and 4000 parts by weight of methylene chloride. The reaction is completed by heating to 30 to 40° C. for 5 minutes, dry air is passed in for 10 minutes, 3000 parts by weight of water are added, the organic phase is separated off, dried over unhydrous sodium sulfate and concentrated in vacuo at 20-30° C. Yield: 468 parts by weight of crude 2,3-toluylene-diisocyanide, which can be purified by recrystallizing from ligroin (yield: 235 parts by weight); M.P. 84-86° C.

EXAMPLE 9

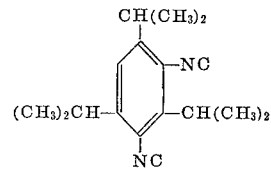

210 parts by weight of phosgene are introduced with stirring at 5-15° C. into a suspension of 290 parts by weight of finely ground 1,3-diformyl-amino-2,4,6-triisopropyl benzene (obtainable from 2,4,6-triisopropyl-1,3-phenylene diamine by refluxing with 98 percent formic acid for 10 hours; M.P. 272-275° C.) in 500 parts by weight of triethyl-amine and 1000 parts by weight of methylene chloride. The mixture is then heated to 30-40° C. for 5-10 minutes. After passing in a strong stream of nitrogen for 10 to 15 minutes and adding 1500 parts by weight of water, the organic phase is separated, dried over anhydrous magnesium sulfate, filtered and concentrated in vacuo at 20 to 30° C. The residue is distilled in vacuo in portions; B.P. 130-135° C./0.25 mm. Hg; M.P. 59-61° C. Yield: 168 parts by weight of 2,4,6-triisopropyl-1,3-phenylene-diisocyanide.

EXAMPLE 10

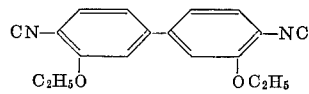

By cooling with ice in a solution of 39 parts by weight of phosgene in 50 parts by weight of methylene chloride is added dropwise to a suspension of 63 parts by weight of N,N'-diformyl - 3,3' - diethoxy-benzidine (obtainable from the respective diamine and formic acid by refluxing; M.P. 205–206° C.), 100 parts by weight of triethylamine and 300 parts by weight of methylene chloride. After adding 200 parts by weight of water, the organic phase is separated, dried over anhydrous potassium carbonate, filtered, concentrated in vacuo at 20 to 40° C. and recrystallized from a mixture of toluene and benzene. Yield: 22 parts by weight of 4,4'-diisocyano-3,3'-diethoxy-diphenyl; M.P. 140–141° C.

EXAMPLE 11

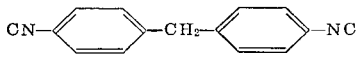

With stirring and cooling with ice 410 parts by weight of phosgene are introduced into a suspension of 436 parts by weight of 4,4'-diformyl-amino-diphenylmethane in 900 parts by weight of triethylamine and 2000 parts by weight of methylene chloride. After completing the reaction to about 30° C. dry air is passed in, 1500 parts by weight of water are added, the organic base is separated and concentrated in vacuo at 20 to 30° C. Yield: 345 parts by weight of crude 4,4'-diphenylmethane-diisocyanide, M.P. 95–115° C. After recrystallization from ethyl acetate the melting point is 125–128° C.

EXAMPLE 12

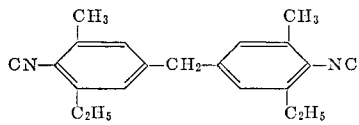

1185 parts by weight of 4,4'-diformyl-amino-3,3'-dimethyl-5,5' - diethyldiphenylmethane (obtainable from the corresponding diamine by heating with 90 percent technical formic acid; M.P. 335–336° C.) are suspended in 1600 parts by weight of triethylamine and 5000 parts by weight of methylene chloride. With stirring and cooling with ice (internal temperature<20° C.) 700 parts by weight of phosgene are introduced. After 5 minutes a stream of nitrogen is passed through the suspension at 30 to 40° C., 2000 parts by weight of water are added, the organic phase is separated, dried under unhydrous potassium carbonate, filtered and concentrated in vacuo at 20 to 40° C. Residue: 979 parts by weight of crude 4,4'-diisocyano-3,3' - dimethyl - 5,5' - diethyl-diphenylmethane of the M.P. 110–116° C. After recrystallizing from ethanol or isopropanol or ethyl acetate the melting point is 127–128° C.

EXAMPLE 13

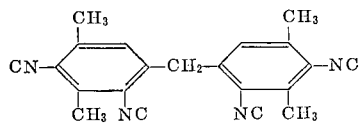

410 parts by weight of phosgene are introduced at 0–15° C. with stirring into a suspension of 394 parts by weight of 2,2',4,4' - tetraformylamino - 3,3',5,5'-tetramethyldiphenyl methane (obtainable from 2,4-diamino-1,3-xylol by condensation with formaldehyde in boiling aqueous alcohol in the presence of about 20% by mol of hydrochloric acid and subsequent treatment in boiling formic acid) 1000 parts by weight of triethylamine and 2000 parts by weight of dioxane. The reaction is completed by heating to 30–40° C., dry air is passed through the mixture and 2000 parts by weight of water are added. The organic phase is separated, dried over potassium carbonate, filtered and concentrated in vacuo. At 15–20° C. 4 parts by weight of an amorphous, crude 3,3',5,5'-tetramethyl-diphenyl - 2,2,4,4' - tetraisocyanide are obtained.

EXAMPLE 14

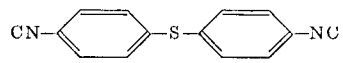

2000 parts by weight of phosgene are introduced into a suspension of 272 parts by weight of 4,4'-diformyl-amino-diphenylthioether (obtainable from 4,4'-diamino-diphenyl-thioether and boiling formic acid), 500 parts by weight of triethylamine, 1200 parts by weight of methylenechloride and 800 parts by weight of water are added. The organic phase is separated and concentrated in vacuo. Yield: 179 parts by weight of 4,4'-diisocyano-thiodiphenylether; decomposition from 105° C.

EXAMPLE 15

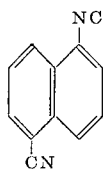

400 parts by weight of 1,5-diformylamino-naphthaline (M.P. 210–211° C.) are suspended with decomposition in 500 parts by weight of triethylamine and 1500 parts by weight of methylene chloride. 210 parts by weight of phosgene are introduced with stirring at 0–15° C., the suspension is heated to 30 to 40° C. for 5 minutes, dry compressed air is blown to the mixture, 2000 parts by weight of water are added, the organic phase is separated, dried over unhydrous potassium carbonate, filtered, concentrated in vacuo and the residue is crystallized from a mixture of benzene/benzine. Yield: 245 parts by weight of 1,5 - naphthylene-diisocyanide; M.P. 197–199° C.

EXAMPLE 16

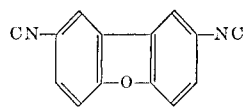

200 parts by weight of phosgene are introduced with stirring at 0–15° C. into a suspension of 254 parts by weight of 2,7 - diformylamino-dibenzofurane (obtainable from diamine and boiling formic acid), 500 parts by weight of triethylamine and 1000 parts by weight of chlorobenzene. 800 parts by weight of water are added, the organic phase is separated and concentrated in vacuo at 30–60° C. Yield: 158 parts by weight of 2,7-diisocyano dibenzofurane; decomposition at 96–99° C.

What is claimed is:
1. 1 - methyl - 3,5 - diethyl - 2,4 - phenylene diisonitrile.
2. 2,4,6 - triisopropyl-1,3-phenylene-diisonitrile.

References Cited

Hieber et al.: Chemical Abstract, vol. 50, p. 13807 (1956.)

CHARLES B. PARKER, Primary Examiner

D. H. TORRENCE, Assistant Examiner

U.S. Cl. X.R.

260—346.2 M, 389, 463, 464, 465 D, 465 F, 465 G, 465.8 R, 562 A, 562 P, 562 R, 857 R, 940, 999